(12) United States Patent
Mays

(10) Patent No.: US 10,160,663 B2
(45) Date of Patent: Dec. 25, 2018

(54) METHOD FOR PURIFYING WATER AND WATER TREATMENT SYSTEM THEREFOR

(71) Applicant: GAS TECHNOLOGY INSTITUTE, Des Plaines, IL (US)

(72) Inventor: Jeffrey A. Mays, Canoga Park, CA (US)

(73) Assignee: Gas Technology Institute, Des Plaines, IL (US)

( * ) Notice: Subject to any disclaimer, the term of this patent is extended or adjusted under 35 U.S.C. 154(b) by 290 days.

(21) Appl. No.: 13/733,941

(22) Filed: Jan. 4, 2013

(65) Prior Publication Data

US 2014/0190817 A1    Jul. 10, 2014

(51) Int. Cl.
*C02F 1/04* (2006.01)
*B01D 1/00* (2006.01)
*F01K 13/00* (2006.01)
*F22B 1/18* (2006.01)

(52) U.S. Cl.
CPC .............. *C02F 1/04* (2013.01); *B01D 1/0088* (2013.01); *C02F 1/045* (2013.01); *F01K 13/006* (2013.01); *F22B 1/1853* (2013.01)

(58) Field of Classification Search
CPC .... C02F 1/02; C02F 1/04; C02F 1/045; C02F 1/048; C02F 1/06; C02F 1/40
USPC ......... 203/10, 11, 21–27; 122/1 C, 6 R, 8, 9, 122/412, 422; 55/DIG. 23
See application file for complete search history.

(56) References Cited

U.S. PATENT DOCUMENTS

| | | | | |
|---|---|---|---|---|
| 3,285,834 | A * | 11/1966 | Guerrieri | ................. C02F 1/10 |
| | | | | 159/16.2 |
| 4,078,976 | A * | 3/1978 | Spears, Jr. | ...................... 203/10 |
| 6,355,145 | B1 | 3/2002 | Kresnyak et al. | |
| 6,536,523 | B1 | 3/2003 | Kresnyak et al. | |
| 6,551,466 | B1 | 4/2003 | Kresnyak et al. | |
| 6,984,292 | B2 | 1/2006 | Kresnyak et al. | |

(Continued)

FOREIGN PATENT DOCUMENTS

| | | |
|---|---|---|
| EP | 1074987 | 11/2004 |
| WO | 8902774 | 4/1989 |
| WO | 2008076963 | 6/2008 |

OTHER PUBLICATIONS

Brochure, Treatment of heavy oil produced water using evaporation and zero discharge technology. GD Water & Process Technologies. 2 pp.

(Continued)

*Primary Examiner* — Prem C Singh
*Assistant Examiner* — Brandi M Doyle
(74) *Attorney, Agent, or Firm* — Pauley Erickson & Kottis

(57) ABSTRACT

A method for purifying water involves heating impure water in a first reboiler, a second reboiler and a combustion steam generator to ultimately produce about 3 parts by weight of clean water and about 1 part by weight of clean steam for every 4 parts by weight of the impure water. A water treatment system includes a gas-fired combustion steam generator that is operable to produce a hot steam stream. A reboiler is connected in receiving communication with the gas-fired combustion steam generator to receive the hot steam stream. A separator is connected with the reboiler and is operable to separate an output stream from the reboiler.

10 Claims, 1 Drawing Sheet

(56) References Cited

U.S. PATENT DOCUMENTS

2008/0083605 A1* 4/2008 Holtzapple ............. C02F 1/041
 203/11
2011/0259586 A1* 10/2011 Latimer et al. ............... 166/275
2012/0000642 A1* 1/2012 Betzer Tsilevich ............. 166/57
2013/0062188 A1* 3/2013 Dighe ............................ 203/11

OTHER PUBLICATIONS

Ahmadun, F.R., Review of technologies for oil and gas produced water treatment. Journal of Hazardous Materials 170 (2009) 530-551.

* cited by examiner

METHOD FOR PURIFYING WATER AND WATER TREATMENT SYSTEM THEREFOR

BACKGROUND

Steam generator systems can include a once-through steam generator and water treatment system to provide purified water to the steam generator. If hard water or produced water from a hydrocarbon recovery system is used in the steam generator, impurities in the water can cause fouling and damage to the components and plumbing. Water treatment systems have a tendency to concentrate impurities over time and require substantial space, capital cost and energy consumption. Additionally, steam generator systems are highly inefficient with respect to the amount of clean water produced from a given amount of unclean water input into the water treatment system.

SUMMARY

A method of purifying water according to an aspect of the present disclosure includes (a) heating impure water in a first reboiler to produce clean water and a first concentrated impure water stream, (b) providing the first concentrated impure water stream into a second, different reboiler to produce additional clean water and a second concentrated impure water stream, (c) providing the second concentrated impure water stream into a gas-fired combustion steam generator to produce a steam stream which includes particulate matter precipitated from the second concentrated impure water stream, (d) separating the particulate matter from the steam stream to produce clean steam and (e) providing the clean stream into the first reboiler and the second reboiler to transfer heat to, respectively, the impure water and the first concentrated impure water stream. The steps (a)-(e) produce about 3 parts by weight of the clean water and about 1 part by weight of the clean steam for every 4 parts by weight of the impure water.

A further non-limiting embodiment of any of the foregoing examples includes providing the clean water from the first reboiler into a turbine.

A further non-limiting embodiment of any of the foregoing examples includes providing the clean water from the second reboiler into a subterranean hydrocarbon reservoir.

A further non-limiting embodiment of any of the foregoing examples includes pressurizing and heating the first concentrated impure water stream between the first reboiler and the second reboiler.

In a further non-limiting embodiment of any of the foregoing examples, the steps (a)-(e) produce 3 parts by weight of the clean water and 1 part by weight of the clean steam for every 4 parts by weight of the impure water.

In a further non-limiting embodiment of any of the foregoing examples, the first reboiler produces the clean water and the first concentrated impure water stream in a ratio, by weight, of about 1:1.

In a further non-limiting embodiment of any of the foregoing examples, the second reboiler produces the additional clean water and the second concentrated impure water stream in a ratio, by weight, of about 1:1.

A water treatment system according to an aspect of the present disclosure includes a gas-fired combustion steam generator operable to produce a hot steam stream, a reboiler which includes an inlet connected in receiving communication with the gas-fired combustion steam generator to receive the hot steam stream, and a separator connected with an outlet of the reboiler and operable to separate an output stream from the reboiler into a steam stream and a liquid water stream.

A further non-limiting embodiment of any of the foregoing examples includes a solids separator arranged between the gas-fired combustion steamed generator and the reboiler.

A further non-limiting embodiment of any of the foregoing examples includes an additional reboiler connected in receiving communication with the reboiler.

A further non-limiting embodiment of any of the foregoing examples includes an additional separator connected in receiving communication with the additional reboiler and operable to separate a product stream from the additional reboiler.

A further non-limiting embodiment of any of the foregoing examples includes a preheater heat exchanger arranged between the reboilers and connected in receiving communication with the additional separator.

A further non-limiting embodiment of any of the foregoing examples includes an additional preheater heat exchanger connected in receiving communication with a second outlet of the additional reboiler.

A further non-limiting embodiment of any of the foregoing examples includes a preheater heat exchanger connected in receiving communication with the separator and connected in receiving communication with the additional separator.

A further non-limiting embodiment of any of the foregoing examples includes a turbine connected in receiving communication with the preheater heat exchanger.

In a further non-limiting embodiment of any of the foregoing examples, the preheater heat exchanger is connected in supplying communication to the gas-fired combustion steam generator.

In a further non-limiting embodiment of any of the foregoing examples, the separator is connected in supplying communication to a subterranean hydrocarbon reservoir.

A water treatment system according to an aspect of the present disclosure includes a gas-fired combustion steam generator operable to produce a hot steam stream, a plurality of reboilers serially connected in receiving communication with the gas-fired combustion steam generator to receive the hot steam stream, and a plurality of separators connected in receiving communication with the plurality of reboilers and operable to separate product streams from the plurality of reboilers into steam streams and liquid water streams.

A further non-limiting embodiment of any of the foregoing examples includes a preheater heat exchanger connected between two of the plurality of separators.

A further non-limiting embodiment of any of the foregoing examples includes a turbine connected in receiving communication with the preheater heat exchanger.

In a further non-limiting embodiment of any of the foregoing examples, the preheater heat exchanger is connected in supplying communication to the gas-fired combustion steam generator.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figures 1, 2:
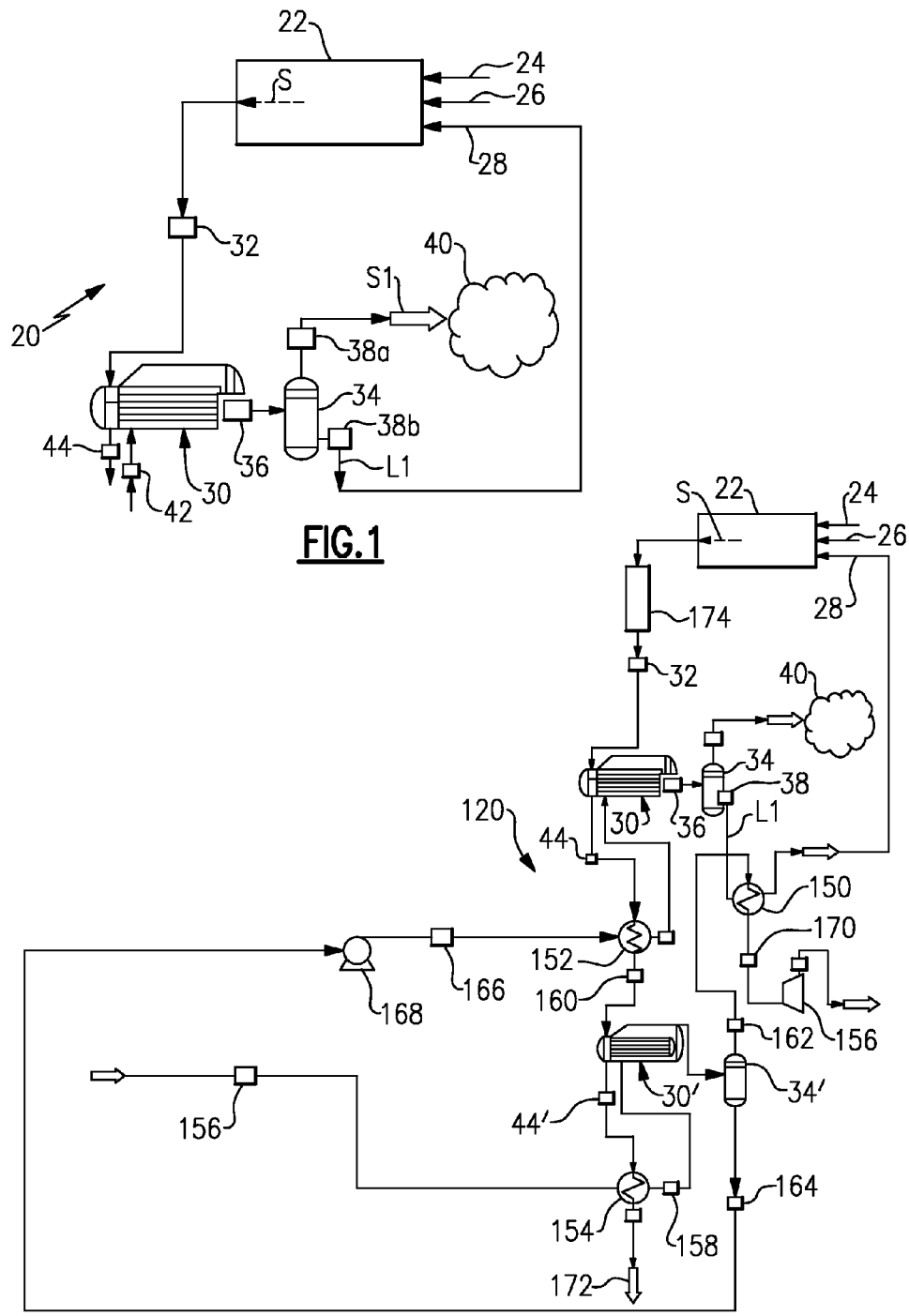
FIG. 1 illustrates an example water treatment system and method related thereto.
FIG. 2 illustrates another example water treatment system and method related thereto.

FIG. 1 schematically illustrates selected portions of an example water treatment system 20. As will be appreciated, the water treatment system 20 can be used for water purification and/or to provide high pressure steam, such as for power generation, enhanced oil recovery in subterranean hydrocarbon reservoirs or other purposes.

In this example, the water treatment system 20 includes a gas-fired combustion steam generator 22 that is operable to produce a hot steam stream S. For instance, a fuel, such as a hydrocarbon, is provided at 24, an oxidant, such as air, is provided at 26 and water is provided at 28 into the gas-fired combustion steam generator 22 to produce the hot steam stream S.

A reboiler 30 includes an inlet at node 32 connected in receiving communication with the gas-fired combustion steam generator 22 to receive the hot steam stream S therefrom. For example, the term "connected in receiving communication" can refer to one component having an inlet that is directly connected an outlet of a second component. The reboiler 30 can be a thermosiphon, such as a kettle reboiler, that generally has two inputs and two outputs. In this disclosure, for the purpose of description, inlets and outlets from the various components are generally shown by box nodes, such as node 32. A separator 34 is connected with an outlet at node 36 of the reboiler 30 and is operable to separate an output stream from the reboiler 30 into a clean steam stream S1 and a concentrated impure water stream L1, which are discharged through respective outlets at nodes 38a/38b. For example, the separator 34 is a flash separator. It is further to be understood that although certain product or output streams may be steam or liquid water streams, the streams can include a mixture of steam and liquid water.

In this example, the clean steam stream S1 from the separator 34 is provided into a subterranean hydrocarbon reservoir 40 and the concentrated impure water stream L1 is provided as an input into the gas-fired combustion steam generator 22. Alternatively, the clean steam stream S1 can be provided to a different end use or cooled to produce clean water.

The water treatment system 20 also embodies a method of purifying water. For example, the method includes heating unclean or unclean water received through an inlet at node 42 into the reboiler 30 to produce a product stream that is discharged through the outlet at node 36. For example, the product stream includes a mixture of steam and liquid water. The product stream is separated in the separator 34 into the clean steam stream S1 and the concentrated impure water stream L1. For example, a ratio by weight of the clean steam stream S1 and the concentrated impure water stream L1 is 1:1. In this example, the clean steam stream S1 is provided to the subterranean hydrocarbon reservoir 40 and the liquid water stream L is provided into the gas-fired combustion steam generator 22 at 28 and, optionally, can also be used for cooling the gas-fired combustion steam generator 22.

The impure or unclean water is water that has impurities, such as mineral deposits. For example, the impure water can be hard water, water that is harder than hard water and/or produced water that is the product of a hydrocarbon recovery system. Produced water is water that has been separated from oil and can have higher hardness than treated water or hard water. In one further example, the impure water is water that has impurities and has not been treated to remove the impurities.

Impurities in the impure water can form solid particulate matter that becomes entrained in the hot steam stream S provided from the gas-fired combustion steam generator 22. In this regard, a separator, such as a cyclone separator, filter or combination thereof, can be used between the gas-fired combustion steam generator 22 and the reboiler 30 to remove the solid particulate matter. Thus, after the hot steam stream is provided into the reboiler 30, it can be discharged through outlet at node 44 from the reboiler 30 as clean water.

FIG. 2 illustrates another example water treatment system 120. In this disclosure, like reference numerals designate like elements where appropriate and reference numerals with the addition of one-hundred or multiples thereof designate modified elements that are understood to incorporate the same features and benefits of the corresponding elements. In this example, the water treatment system 120 includes an additional reboiler 30', an additional separator 34', preheaters 150, 152 and 154, and a turbine 156. The reboilers 30/30' can be thermosiphons, such as a kettle reboilers, that generally each have two inputs and two outputs. The preheaters 150, 152 and 154 can be plate and fin heat exchangers for indirect heat transfer between two input streams.

The preheater 150 is connected in receiving communication with the separators 34/34'. The turbine 156 is connected in receiving communication with the preheater heat exchanger 150 to receive the clean water stream from the separator 34' through the preheater heat exchanger 150.

The preheater heat exchanger 152 is connected between the reboilers 30/30' and is also connected in receiving communication with a concentrated impure water stream from the separator 34'. The preheater heat exchanger 154 is connected in receiving communication with the outlet at node 44' of the additional reboiler 30'.

Operationally, impure water is provided to an inlet at node 156 of the preheater heat exchanger 154 and is heated therein by a hot stream provided from the outlet at node 44' from the reboiler 30'. The heated impure water from the preheater heat exchanger 154 is provided through an outlet at node 158 into the reboiler 30' (first reboiler). The impure water is heated in the reboiler 30' by a hot stream provided from an outlet at node 160 from the preheater heat exchanger 152 to provide a product stream into the separator 34'. The product stream from the reboiler 30' can include a mixture of steam and liquid.

The separator 34' separates the product stream into a clean water stream and a concentrated impure water stream. For example, the reboiler 34' produces clean water and concentrated impure water in a ratio, by weight, of about 1:1. The clean water stream is discharged through an outlet at node 162 into the preheater heat exchanger 150. The concentrated impure water stream is discharged at node 164 into an inlet at node 166 into the preheater heat exchanger 152, where the concentrated impure water stream is heated and pressurized. In this example, a pump 168 is provided to facilitate flow. The clean water stream from the separator 34' is heated in the preheater heat exchanger 150 by the product stream from the separator 34. This clean water stream can include steam, liquid water or a mixture thereof that is then provided to an inlet at 170 to the turbine 56. The clean water stream is expanded over the turbine 156 and the resulting output can be chilled to produce clean water. The turbine 156 can be connected to a generator to generate power and/or can be connected to one or more compressors that compress oxidant gas that is input at 26 into the gas-fired combustion steam generator 22. For example, the oxidant gas can be compressed to a pressure of approximately 450 psig (3.1 MPa).

The hot product stream that is discharged through the outlet at node 44 from the reboiler 30 (second reboiler) is provided through the preheater heat exchanger 152 and then into the reboiler 30' before being discharged through the outlet at 44' into the preheater heat exchanger 154. The hot product stream, which can include steam, liquid water or both, is then discharged at 172 as additional clean water.

In this example, a particulate matter separator 174 is provided between the gas-fired combustion steam generator 22 and the reboiler 30 and is operable to remove solid particulate matter from the hot steam stream S. For example, the particulate matter separator 174 includes a cyclone separator, a filter or combinations thereof, to remove the solid particulate matter. The hot steam stream discharged from the separator 144 flows to the inlet at node 32 into the reboiler 30 thus is clean, ultimately providing clean water at 172.

The clean water discharged at 172 and the clean water discharged from the separator 34' can be used for any desired purpose but in this example is used in the turbine 156. In one further example, at least one of these clean water streams is used in a conventional once-through steam generator to generate additional steam, which can be used for power generation or can be injected into the subterranean hydrocarbon reservoir 40. The water treatment system 120 can produce about 3 parts by weight of the clean water and about 1 part by weight of the clean steam for every 4 parts by weight of the impure water input and is thus highly efficient. As a further example, 90% or more by weight of the impure water is ultimately converted to clean water and clean steam.

As can also be appreciated, the water treatment system 20/120 can be used for a variety of purposes, such as a replacement for a conventional water treatment system that is used in combination with a once-through steam generator that requires relatively pure water input. Additionally, the water treatment system 20/120 can be integrated with a central hydrocarbon processing facility to utilize produced water from hydrocarbon recovery. A typical once-through steam generator converts about 80% of the input water into steam and the remaining effluent water, which includes some impurities, is recycled back into the process for further water treatment. Thus, over time, the impurities concentrate in the once-through steam generator. However, the water treatment system 20/120 can operate with an input of produced or hard water to produce steam that can be used for hydrocarbon recovery and clean water that can be input into a conventional once-through steam generator. Alternatively, if all clean water is desired, the steam can be chilled to produce four parts clean water. The water treatment system 20/120 is also relatively compact and economical in comparison to conventional water treatment systems. The water treatment system 20/120 is also robust with regard to impurities in the input produced or hard water and thus can reduce maintenance and/or shutdown periods.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of purifying water, the method comprising:
    (a) heating impure water in a first reboiler to produce clean water and a first concentrated impure water stream, wherein the impure water comprises a product of a hydrocarbon recovery system;
    (b) providing the first concentrated impure water stream into a second, different reboiler to produce additional clean water and a second concentrated impure water stream;
    (c) providing the second concentrated impure water stream into a gas-fired combustion steam generator to produce a steam stream including particulate matter precipitated from the second concentrated impure water stream;
    (d) discharging the steam stream including particulate matter precipitated from the second concentrated impure water stream from the gas-fired combustion steam generator;
    (e) introducing the discharged steam stream including particulate matter precipitated from the second concentrated impure water stream into a particulate separator to separate the particulate matter from the steam stream to produce a clean steam stream; and
    (f) providing the clean steam stream sequentially to the second reboiler and the first reboiler to, respectively, transfer heat to the first concentrated impure water stream and the impure water,
    said steps (a)-(f) producing about 3 parts by weight of the clean water and about 1 part by weight of the clean steam for every 4 parts by weight of the impure water.

2. The method as recited in claim 1, further including providing the clean water from the first reboiler into a turbine.

3. The method as recited in claim 1, further including providing the clean water from the second reboiler into a subterranean hydrocarbon reservoir.

4. The method as recited in claim 1, further including pressurizing and heating the first concentrated impure water stream between the first reboiler and the second reboiler.

5. The method as recited in claim 1, wherein the first reboiler produces the clean water and the first concentrated impure water stream in a ratio, by weight, of about 1:1.

6. The method as recited in claim 1, wherein the second reboiler produces additional clean water and the second concentrated impure water stream in a ratio, by weight, of about 1:1.

7. The method as recited in claim 1, wherein the gas-fired combustion steam generator is a direct contact gas-fired combustion steam generator wherein the second concentrated impure water stream directly contacts fuel and oxidant.

8. The method as recited in claim 1, wherein the particulate separator is selected from the group consisting of a cyclone separator, a filter or a combination thereof.

9. The method as recited in claim 1, wherein the second reboiler operates at a higher pressure than the first reboiler.

10. A method of purifying water, the method comprising:
(a) heating impure water in a first reboiler to produce clean water and a first concentrated impure water stream, the impure water containing impurities;
(b) providing the first concentrated impure water stream into a second, different reboiler to produce additional clean water and a second concentrated impure water stream, the second reboiler operating at a higher pressure than the first reboiler;
(c) providing the second concentrated impure water stream into a direct contact gas-fired combustion steam generator to precipitate particulate matter from the second concentrated impure water stream and produce a steam stream including the particulate matter precipitated from the second concentrated impure water stream;
(d) providing the steam stream including particulate matter precipitated from the second concentrated impure water stream to a particulate separator selected from a group consisting of a cyclone separator, a filter or a combination thereof to separate the particulate matter from the steam stream to produce a clean steam stream; and
(e) providing the clean steam stream sequentially to the second reboiler and the first reboiler to, respectively, transfer heat to the first concentrated impure water stream and the impure water.

* * * * *